US009126852B2

(12) United States Patent
Oberholtzer et al.

(10) Patent No.: US 9,126,852 B2
(45) Date of Patent: Sep. 8, 2015

(54) MOBILE SYSTEM FOR TREATMENT OF WATER BY DEIONIZATION

(75) Inventors: Richard Oberholtzer, Magnolia, TX (US); Bruce Brown, Layton, UT (US); Tim Anderson, Riverton, UT (US); Daron Johnson, South Jordan, UT (US)

(73) Assignee: Infilco Degremont, Inc., Richmond, VA (US)

( * ) Notice: Subject to any disclaimer, the term of this patent is extended or adjusted under 35 U.S.C. 154(b) by 330 days.

(21) Appl. No.: 13/474,207

(22) Filed: May 17, 2012

(65) Prior Publication Data

US 2013/0134097 A1     May 30, 2013

Related U.S. Application Data

(60) Provisional application No. 61/487,099, filed on May 17, 2011.

(51) Int. Cl.
| | |
|---|---|
| *B01D 15/00* | (2006.01) |
| *C02F 1/42* | (2006.01) |
| *B01J 39/08* | (2006.01) |
| *B01J 41/08* | (2006.01) |

(Continued)

(52) U.S. Cl.
CPC . *C02F 1/42* (2013.01); *B01J 39/08* (2013.01); *B01J 41/08* (2013.01); *B01J 47/002* (2013.01); *B01J 47/026* (2013.01); *B01J 47/028* (2013.01); *B01J 47/04* (2013.01); *B01J 49/0008* (2013.01); *B01J 49/0013* (2013.01); *B01J 49/0021* (2013.01); *B60P 7/0815* (2013.01); *B60P 7/0892* (2013.01); *C02F 1/004* (2013.01); *C02F 1/76* (2013.01); *C02F 2001/422* (2013.01); *C02F 2001/425* (2013.01); *C02F 2001/427* (2013.01); *C02F 2201/004* (2013.01); *C02F 2201/008* (2013.01); *C02F 2209/001* (2013.01); *C02F 2209/003* (2013.01); *C02F 2303/16* (2013.01)

(58) Field of Classification Search
CPC ...... C02F 2201/008; C02F 1/42; B01J 47/002
USPC ............ 210/236, 241, 249, 250, 289; 410/42, 410/47, 77, 80
See application file for complete search history.

(56) References Cited

U.S. PATENT DOCUMENTS

| | | |
|---|---|---|
| 2,620,748 A | 12/1952 | Sheilds |
| 2,938,868 A | 5/1960 | Carlson |

(Continued)

OTHER PUBLICATIONS

Patent Cooperation Treaty International Search Report, PCT/US 12/38379, Sep. 2012.

(Continued)

*Primary Examiner* — Matthew O Savage
(74) *Attorney, Agent, or Firm* — Landmark Intellectual Property Law, PLLC

(57) ABSTRACT

The present invention is generally directed to a versatile fluid treatment system which includes: a mobile device; a track system connected to the mobile device; one or more treatment vessels removably attached to the track system, each treatment vessel comprising a treatment material disposed inside the treatment vessel, at least one fluid inlet, and at least one fluid outlet; an input conduit that receives a fluid to be treated, the input conduit in fluid communication with the fluid inlet on the treatment vessel; and an output conduit in fluid communication with the fluid outlet on the treatment vessel, the output conduit receives treated fluid from the treatment vessels via the fluid outlet.

9 Claims, 10 Drawing Sheets

(51) Int. Cl.
*B01J 47/02* (2006.01)
*B01J 47/04* (2006.01)
*B01J 49/00* (2006.01)
*B01J 47/00* (2006.01)
*C02F 1/76* (2006.01)
*B60P 7/08* (2006.01)
*C02F 1/00* (2006.01)

(56) References Cited

U.S. PATENT DOCUMENTS

| | | |
|---|---|---|
| 3,329,272 A | 7/1967 | Roach |
| 3,630,365 A | 12/1971 | Woodbridge |
| 3,654,875 A | 4/1972 | Vik |
| 3,677,436 A | 7/1972 | Danielson |
| 3,985,648 A | 10/1976 | Casolo |
| 4,049,548 A | 9/1977 | Dickerson |
| 4,053,408 A | 10/1977 | O'Cheskey |
| 4,155,846 A | 5/1979 | Novak |
| 4,219,413 A | 8/1980 | Jackson |
| 4,305,826 A | 12/1981 | Moses |
| 4,383,920 A | 5/1983 | Muller |
| 4,556,492 A | 12/1985 | Dickerson |
| 4,642,007 A * | 2/1987 | Marshall et al. ............... 410/78 |
| 4,659,460 A | 4/1987 | Muller |
| 4,662,669 A | 5/1987 | Erickson |
| 4,818,411 A | 4/1989 | Dickerson |
| 5,259,524 A | 11/1993 | Eckert |
| 6,001,262 A | 12/1999 | Kelada |
| 6,080,313 A | 6/2000 | Kelada |
| 2002/0130092 A1 | 9/2002 | McCune |
| 2003/0129095 A1 | 7/2003 | Farina |
| 2004/0188337 A1 | 9/2004 | Miers |
| 2006/0144780 A1 | 7/2006 | Jensen |
| 2008/0283467 A1 | 11/2008 | Nguyen |
| 2008/0286174 A1 | 11/2008 | Diamond et al. |

OTHER PUBLICATIONS

Written Opinion of the International Searching Authority, dated Sep. 21, 2012, International Application No. PCT/US12/38379.

* cited by examiner

FIGURE 8
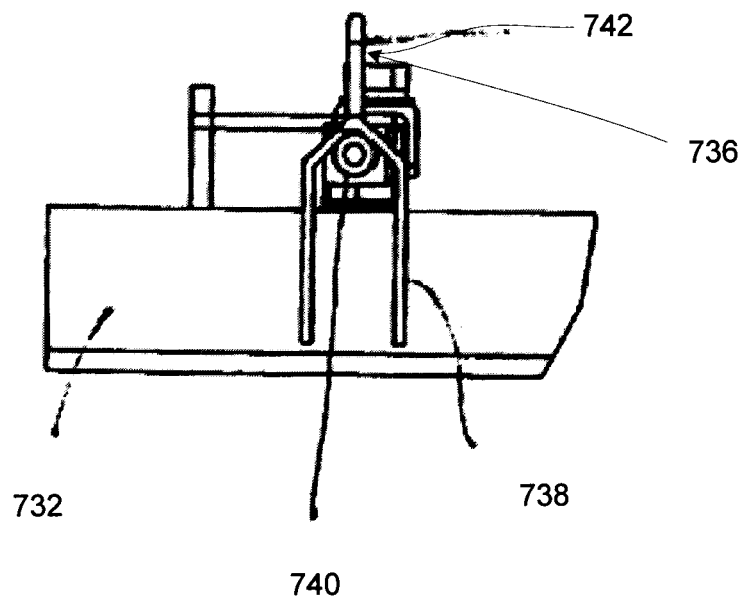
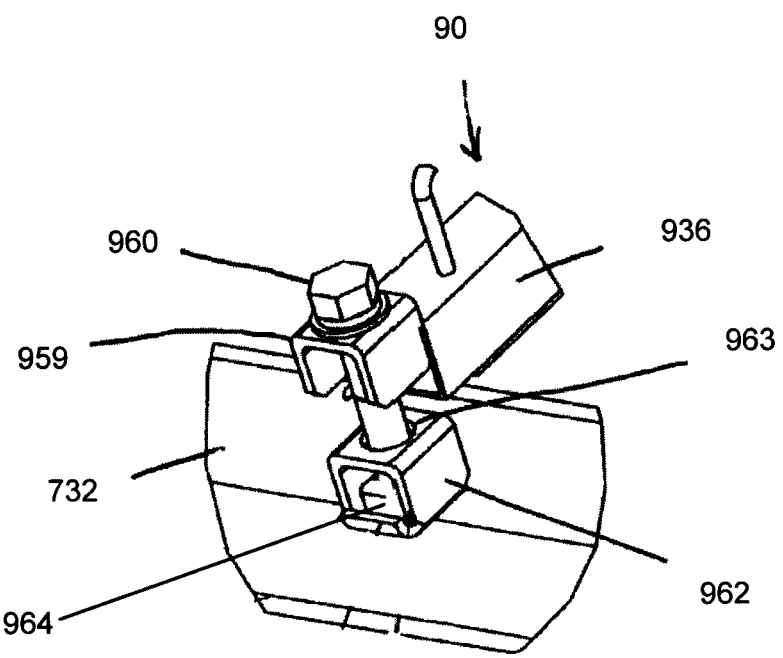
FIGURE 9

MOBILE SYSTEM FOR TREATMENT OF WATER BY DEIONIZATION

BACKGROUND

The present invention is generally directed to methods and systems for treating water and wastewater. Specifically, the present invention is directed to mobile systems for the treatment of water and wastewater by deionization.

Wastewater and water may be treated for a variety of reasons, depending on the fluid and its use. Water used in industrial applications, for example heat exchangers, cooling towers, desalination systems, cleaning systems, pipe lines, gas scrubber systems, refineries and associated equipment often contains various impurities. The impurities may combine and form precipitates due to the pH, pressure, or temperature in the system or the presence of additional ions with which they form insoluble products. Such water and wastewater may be subject to ionic pollution that may be a threat to ecological balance. Ground water and wastewater also often contain undesirable impurities.

Water may be too "hard" for certain applications due to excess calcium, magnesium and carbonate ions, which may react with phosphate, sulfate, and silicate ions and form the insoluble salts. Water and wastewater may also contain various solids such as mud, clay, iron oxides, silt, sand, and other mineral matter and microbiological debris which may accumulate as sludge deposits in a system.

One method for the treatment of water and wastewater is through a deionization and demineralization process. A common deionization process is the use of an ion exchange resin. Generally speaking, the ion exchange resin is contained in a treatment vessel through which the water or wastewater to be treated is passed. As the fluid passes through and around the ion exchange resin, ions in the fluid to be processed are exchanged with ions found in the resin, thereby removing objectionable ions from the fluid and exchanging them for less objectionable ions found in the resin. However, as ions are exchanged, the efficacy of the resin is reduced. Eventually, a steady state is reached in which no further objectionable ions in the fluid to be processed can be exchanged for the less objectionable ions found in the resin.

Ion exchange resins may be regenerated by removing the objectionable ions from the resin and replacing these with the less objectionable ions, known as regeneration. During regeneration, a substance having a high concentration of the less objectionable ions is applied to the ion exchange resin. Because this produces a new balance of concentrations between the respective ions, the ion exchange resin now exchanges the objectionable ions captured during the service cycle for the less objectionable ions applied during regeneration. As a result of this process, the ability of the ion exchange resin to remove objectionable ions from the fluid to be processed is restored.

However, the regeneration process can be relatively lengthy, and during which the treatment vessel being regenerated is off-line and is not treating water or wastewater. Accordingly, it is desirable to utilize systems and methods that permit water and wastewater treatment systems to be minimally impacted by the need to regenerate ion exchange resins.

Additionally, certain applications do not require a permanent treatment facility. Accordingly, there is a need for temporary or mobile systems. Mobile deionization systems are known in the art. Examples include the disclosures as set forth in, for example, U.S. Pat. Nos. 4,379,940; 4,383,920; 4,487,959; 4,540,493; 4,556,493; 4,675,108; 4,659,460; and 4,818,411.

Such mobile systems often face the same drawbacks as larger systems inasmuch as the systems must spend time off-line in order to regenerate the ion exchange resin. Accordingly, systems and methods that permit mobile systems to be minimally impacted by the need to regenerate ion exchange resins is desirable.

Moreover, both stationary and mobile systems have the drawback of lack of flexibility in order to provide the ability to optimize the treatment system. For example, it is not well known in the art of mobile treatment systems to monitor the fluid to be treated and the resultant treated water to determine the effectiveness of the system. Certain prior art mobile systems only monitor characteristics of the water after it has been treated. This single data point makes it difficult to contour a treatment system for a particular application or for changing conditions with a single application. In general, prior art systems are not easily modified, adapted, or contoured for different applications or changing conditions. Accordingly, such measurements were not as useful.

Accordingly, there is a need for a treatment system that can measure, in or near real-time, the efficacy of the system so that required or desired modifications can be identified. Furthermore, there is a need for a mobile treatment system that can be quickly and efficiently modified, adapted, or contoured for a particular application or changing conditions. It is also desirable to utilize the ability to quickly modify and adapt treatment systems in order to require less off-line time during the regeneration of ion exchange resins used in such systems.

SUMMARY

Aspects of the invention may comprise a versatile fluid treatment system which may comprise: a mobile device; a track system connected to the mobile device; one or more treatment vessels removably attached to the track system, each treatment vessel comprising a treatment material disposed inside the treatment vessel, at least one fluid inlet, and at least one fluid outlet; an input conduit that receives a fluid to be treated, the input conduit in fluid communication with the fluid inlet on the treatment vessel; and an output conduit in fluid communication with the fluid outlet on the treatment vessel, the output conduit receives treated fluid from the treatment vessels via the fluid outlet.

Aspects of the invention may further comprise methods for treating a fluid using an adaptable treatment system, the treatment system in fluid communication with the fluid to be treated, the treatment system comprising one or more treatment vessels, each comprising the same or different treatment materials, the method comprising: determining a first characteristic or quality of the fluid before the fluid enters the treatment system; treating the fluid by the treatment system; determining a second characteristic or quality of the fluid after the fluid exits the treatment system, wherein the first and second characteristic or quality may be the same; comparing the first characteristic or quality with the second characteristic or quality and determining the efficacy of the treatment system; removing, supplementing, or modifying the one or more treatment vessels.

Aspects of the invention may further comprise a guide and locking device for use with treatment vessels in a fluid treatment system, the guide and locking device providing releasable connection between a first surface and one or more treatment vessels, the guide and locking device comprising: two or more guide rails, the guide rails being substantially parallel; one or more cross members, the cross members extending between the guide rails in a substantially perpendicular configuration, the cross members being removably attached to the guide rails; one or more locking devices, the locking devices removably attached to the guide rails or the cross members, each locking devices configured to receive a structure fixed to a treatment vessel in order to releasably lock the treatment vessel into a location along the guide rails.

These and other aspects will become apparent from the following description of the invention taken in conjunction with the following drawings, although variations and modifications may be effected without departing from the spirit and scope of the novel concepts of the invention.

BRIEF DESCRIPTION OF THE DRAWINGS

The present invention can be more fully understood by reading the following detailed description together with the accompanying drawings, in which like reference indicators are used to designate like elements. The accompanying figures depict certain illustrative embodiments and may aid in understanding the following detailed description. Before any embodiment of the invention is explained in detail, it is to be understood that the invention is not limited in its application to the details of construction and the arrangements of components set forth in the following description or illustrated in the drawings. The embodiments depicted are to be understood as exemplary and in no way limiting of the overall scope of the invention. Also, it is to be understood that the phraseology and terminology used herein is for the purpose of description and should not be regarded as limiting. The detailed description will make reference to the following figures, in which:

FIG. 8 is an exploded view of one end portion of a locking system that may be used in conjunction with a mobile water and wastewater treatment system in accordance with some embodiments of the present invention.

FIG. 9 is an exploded view of an opposed end portion of a locking system that may be used in conjunction with a mobile water and wastewater treatment system in accordance with some embodiments of the present invention.

DETAILED DESCRIPTION

Figure 1:
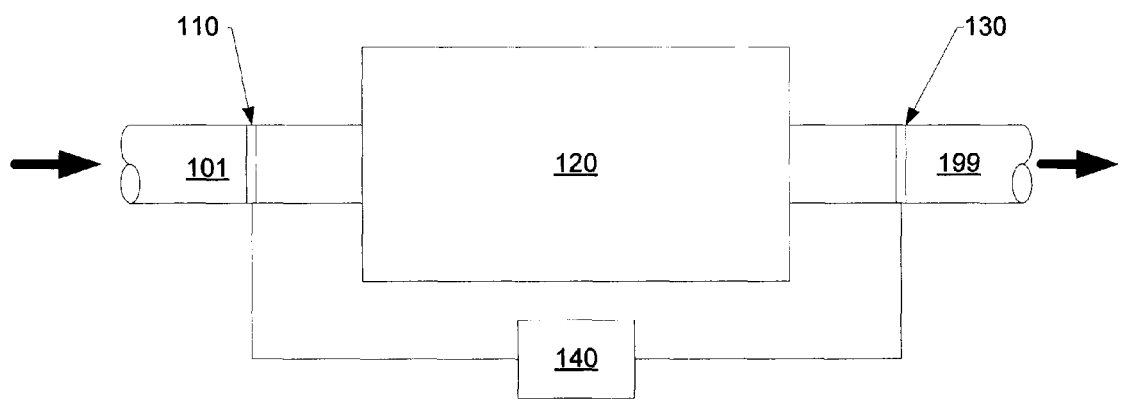
FIG. 1 is a block diagram of a water and wastewater treatment system in accordance with some embodiments of the present invention.

The matters exemplified in this description are provided to assist in a comprehensive understanding of various exemplary embodiments disclosed with reference to the accompanying figures. Accordingly, those of ordinary skill in the art will recognize that various changes and modifications of the exemplary embodiments described herein can be made without departing from the spirit and scope of the claimed invention, and that the following description is intended to refer to specific examples of structure selected for illustration in the drawings and is not intended to define or limit the disclosure, other than in the appended claims. Descriptions of well-known functions and constructions are omitted for clarity and conciseness. Moreover, as used herein, the singular may be interpreted in the plural, and alternately, any term in the plural may be interpreted to be in the singular.

Attention is directed to FIG. 1, which depicts a block diagram of a system 10 for the treatment of water and/or wastewater, in accordance with some embodiments of the present invention. In general, the fluid to be treated travels in conduit 101 to treatment device 120. Before reaching treatment device 120, the fluid to be treated monitored at 110, where certain characteristics, qualities, and/or components of the fluid to be treated are measured, captured, or otherwise identified. Fluid is treated at treatment device 120, which may for example, be a deionization system utilizing ion exchange resins. Treated fluid leaves the treatment device 120 in conduit 199. As the treated fluid leaves the treatment device, it may be monitored at 130, where certain characteristics, qualities, and/or components of the fluid to be treated are measured, captured, or otherwise identified. The differences, or deltas, between the characteristics, qualities, and/or components of the fluid to be treated that are measured, captured, or otherwise identified at 110 are compared with those at 130. Such comparison may be accomplished through the use of processor 140, which receives inputs of data from both 110 and 130 and compares the data received. In this manner, the efficacy, efficiency, and/or impact of the treatment device 120 may be determined.

Understanding the impact the treatment system 120 has may be useful in providing modifications, alterations, or contouring of the treatment system 120 in order to produce the most effective, efficient, and appropriate treatment system.

Figure 2:
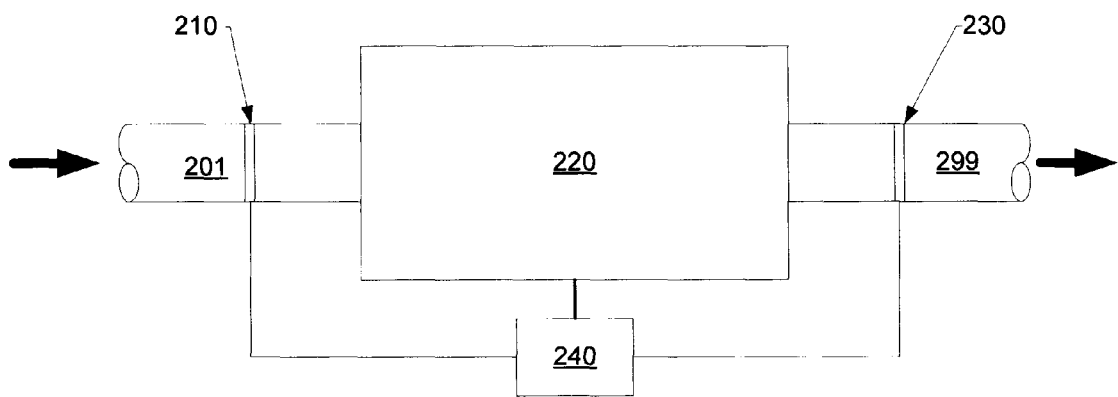
FIG. 2 is a block diagram of a water and wastewater treatment system in accordance with some embodiments of the present invention.

With reference to system 20 in FIG. 2, fluid to be treated travels in conduit 201 through monitor 210 to treatment device 220. After treatment the treated fluid travels in conduit 299 through monitor 230. Monitor 210 and 230 determine, measure, observe, or otherwise identify characteristics, qualities, and/or components of the fluid both before and after treatment. The data captured by monitors 210 and 230 are passed to processor 240 which may compare the data. Unlike the system 10 illustrated in FIG. 1, the system 20 has a direct link 250 between processor 240 and the treatment device 220. In this manner, the treatment device may be modified, altered or contoured during service. In addition, it is contemplated that "on the fly" for near real-time modifications and adaptations may occur based upon the information received. Such an arrangement may provide for more efficient and effective water and/or wastewater treatment.

Figure 3:
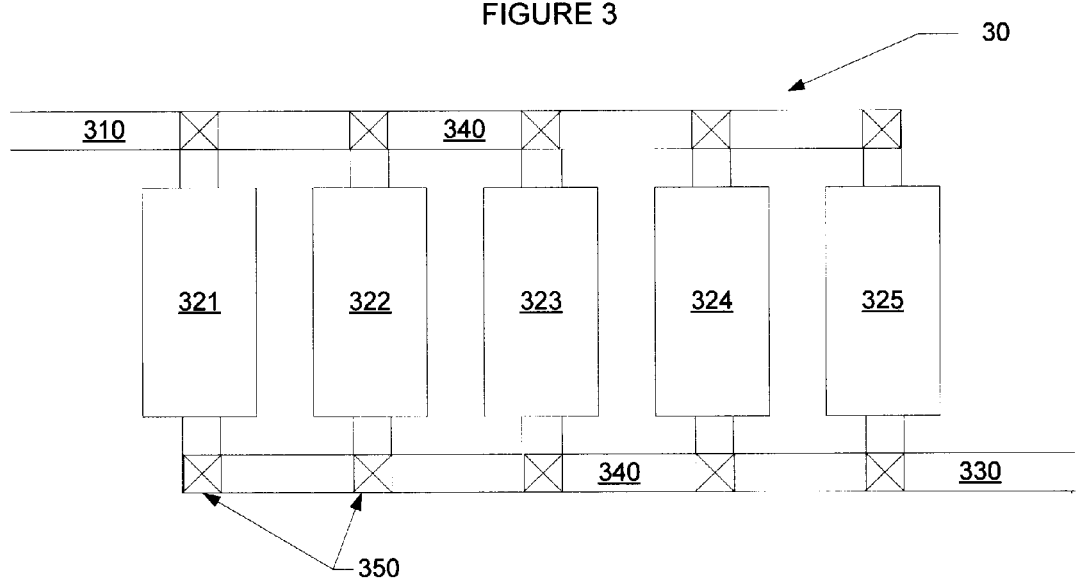
FIG. 3 is a diagram of a water and wastewater treatment system in accordance with some embodiments of the present invention.

FIGS. 1 and 2 abstractly refer to a treatment device 120, 220, which may be any water and/or wastewater treatment device as known in the art. FIG. 3 illustrates a water and wastewater treatment device 30 comprising a plurality of treatment vessels (321, 322, 323, 324, 325). The treatment vessels can contain any number of types of material suitable for treating water or wastewater. For example, in its simplest form, the material could be sand or other filter material. Other materials can include those that import a treatment substance to the water or wastewater such as chlorine, for example. The remainder of this discussion will focus on the use of deionization systems comprising one or more treatment vessels that may comprise an anion, cation, or mixture of anion and cation exchange resins. Such a system may perform a deionization process on the water and wastewater using an ion exchange.

Each treatment vessel may comprise an ion exchange resin directed towards exchanging either cation or anions, or a mixture of both, from the fluid to be treated. The number of cation vessels, anion vessels, and mixture of cation and anion vessels may be altered depending upon the specific application and the impurities sought to be removed from the water to be treated. For example, treatment vessel 321 and 322 may comprise cation exchange resin, treatment vessels 323 and 324 may comprise anion exchange resin, and treatment vessel 325 may comprise both cation and anion exchange resin. This arrangement may be altered in any way applicable to the specific application, and certain types may be omitted (e.g., the vessels may only comprise anion exchange resin and cation exchange resin).

Fluid to be treated may travel to the water and wastewater treatment system 30 via conduit 310. Treated water may depart the water and wastewater treatment system 30 via conduit 330. The treatment vessels (321, 322, 323, 324, 325) may be connected by conduit 340 and may comprise a plurality of valves 350. The use of conduit 340 and valves 350 provide flexibility in the treatment of the water and wastewater, as discussed more thoroughly with regard to FIGS. 4A and 4B.

Figures 4A, 4B:
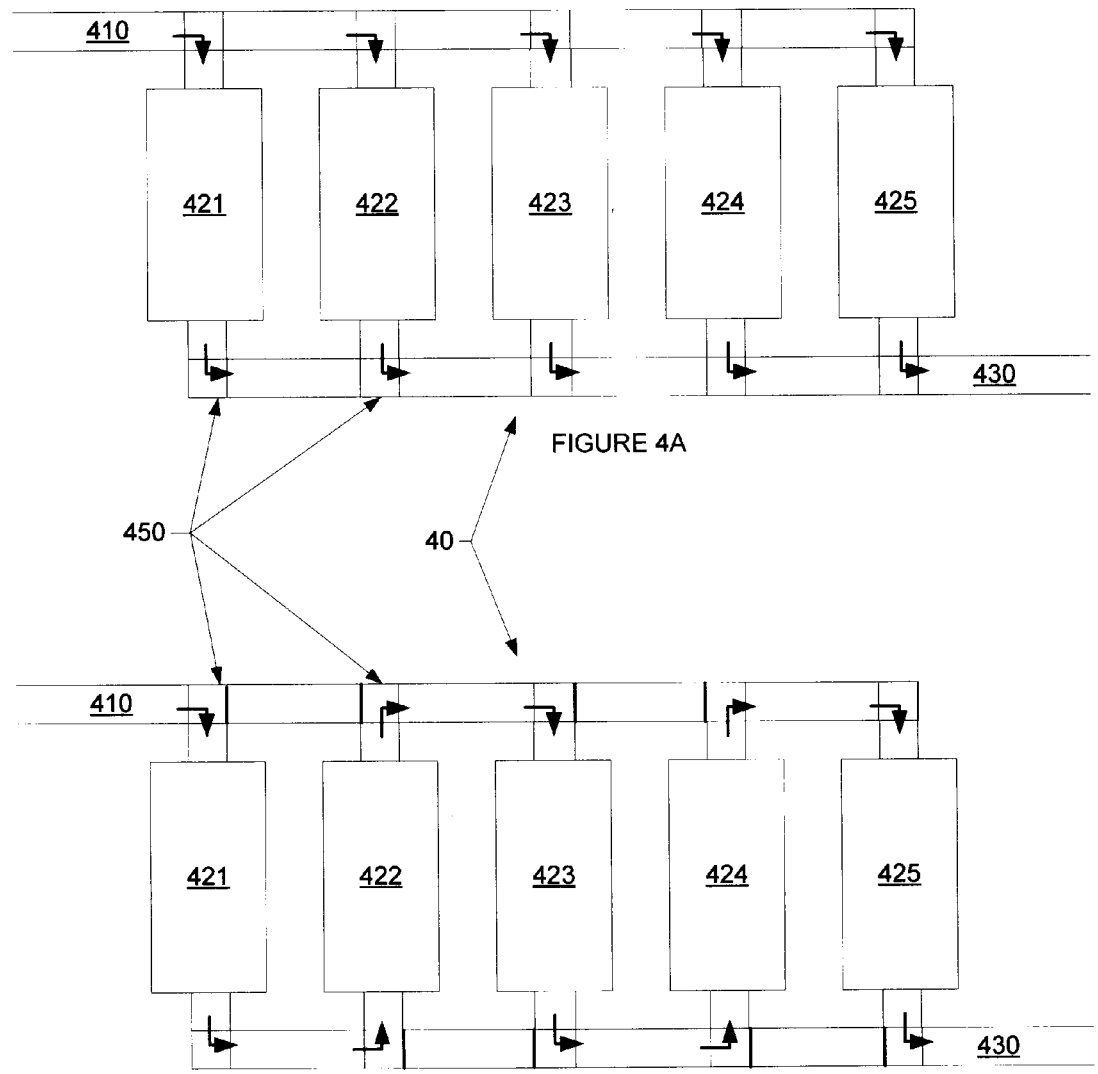
FIGS. 4A and 4B are diagrams of a water and wastewater treatment system in accordance with some embodiments of the present invention.

Directing attention to FIG. 4A, a water and wastewater treatment system 40 may be operated in a parallel arrangement. Such arrangement may be accomplished through the opening of valves 450 so that the fluid to be treated may simultaneously flow through treatment vessels 421, 422, 423, 424, and 425. FIG. 4B illustrates a water and wastewater treatment system 40 that may be operated in serial arrangement. This serial arrangement may be accomplished through the partial closing of valves 450 so that the water to be treated sequentially flows through treatment vessels 421, 422, 423, 424, and 425. Utilizing control of valves 450, any combination of serial and parallel systems may be accomplished. For example, the system may be configured for parallel arrangement through cation vessels 421 and 422, followed by parallel arrangement through anion vessels 423 and 424, serially followed by treatment through anion/cation vessel 425. Those of ordinary skill in the art will recognize the various configurations that may be accomplished.

The ability to operate the water and wastewater treatment in various manners may be advantageous in order to adapt the system to specific applications or changing conditions. If a reduced efficiency or efficacy of the system is determined (for example, utilizing the multiple data points captured by monitors 110, 210 and 130, 230 as depicted in FIGS. 1 and 2), the system may be configured differently.

Figure 5:
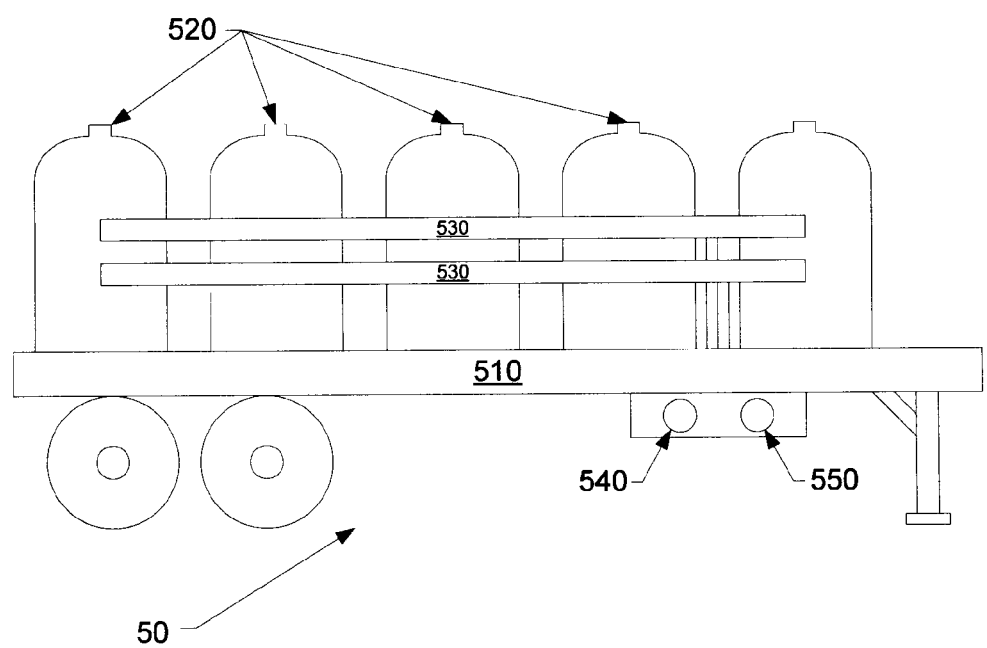
FIG. 5 is a diagram of a mobile water and wastewater treatment system in accordance with some embodiments of the present invention.

Attention is now directed to FIG. 5, which depicts a mobile water and wastewater treatment system 50 in accordance with some embodiments of the present invention. Mobile water and wastewater treatment system 5 may comprise a mobile transportation device 510, for example a trailer, a plurality of treatment vessels 520, conduit 530 connecting the treatment vessels so that various treatment configurations may be accomplished, and system input 540 and output 550. The mobile water and wastewater treatment system 50 may be transported to a location where treatment is desired. Such mobile systems may be used for numerous purposes and applications, for example for temporary treatment, supplementation to on-site installed treatment system, or for periodic treatment.

While permanently installed water and wastewater treatment systems may be designed and configured for the specific fluid to be treated, the mobile and somewhat transitory nature of mobile treatment devices 50 require that the systems be adaptable for various applications. This adaptability may be driven by the measured efficiency and efficacy of the system (as discussed above with regard to monitors 110, 210 and 130, 230), as well as for the particular application, location, and specifics of the fluid to be treated. Accordingly, in addition to providing flexibility in the arrangement of the treatment system (e.g., serial versus parallel arrangements, etc.), it is desirable to have a mobile system capable of further adaptations. Moreover, because of the time required to regenerate ion exchange resins used in the treatment vessels, such adaptability may provide the ability to quickly swap out effective treatment vessels with ineffective treatment vessels requiring regeneration.

Figure 6A:
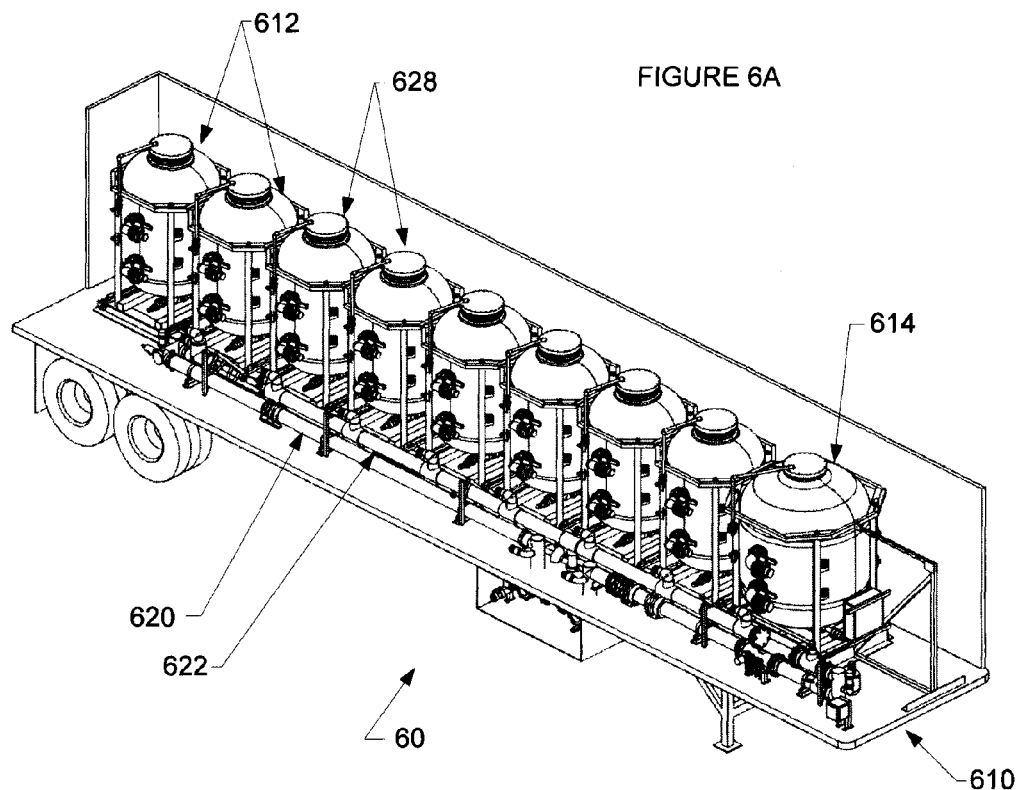
FIGS. 6A and 6B are schematic perspective view of a mobile water and wastewater treatment system in accordance with some embodiments of the present invention.
Figure 6B:
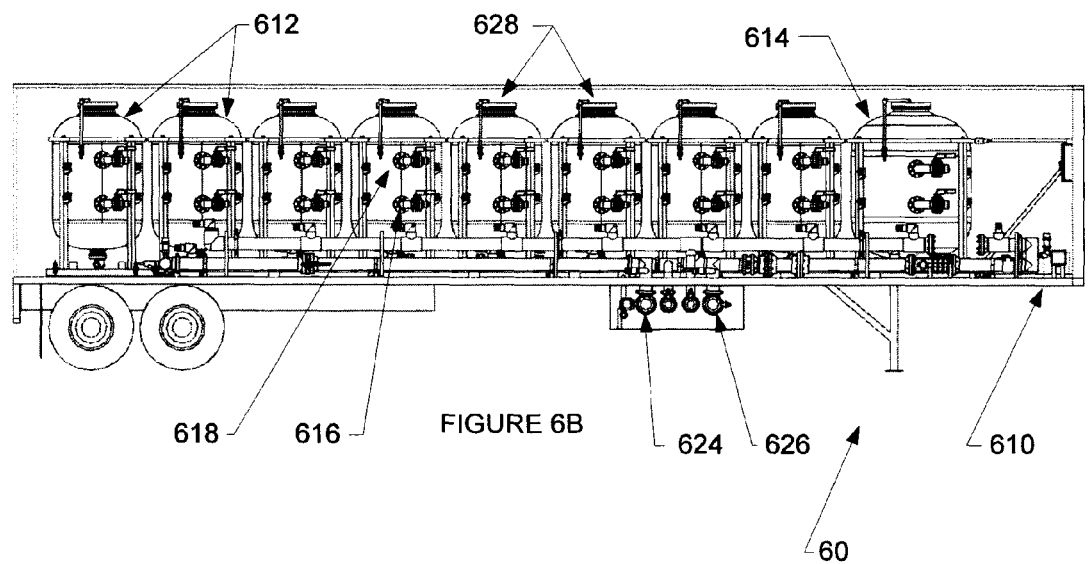

Turning now to FIGS. 6A and 6B, in accordance with some embodiments of the present invention a water and wastewater treatment system 60 that is transportable, portable and/or mobile is depicted. The system 60 may comprise a housing or trailer 610, which comprises a plurality of treatment vessels 612. The number and size of tanks in any particular trailer 610 can be varied depending on any number of factors such as the treatment capacity of the system. The treatment vessels 612 may contain cation exchange resin, anion exchange resin and/or a mixture of cation and anion exchange resin. The treatment vessels 612 may all be of the same size, or may be different sized vessels (for example, a treatment vessel 614 comprising a mixture of cation and anion exchange resin may be larger than the other treatment vessels 612).

Treatment vessels 612, 614 may comprise a fluid inlet 616 and a fluid outlet 618 for the fluid to be treated. Treatment vessels 612, 614 may also comprise a sealable resin access opening 628 through which the treatment material, for example ion exchange resins, may be added to and removed from the various treatment vessels.

In operation, fluid to be treated may be provided from the facility supplying the water or wastewater to be treated to system 60 via main inlet 624. Main inlet 624 is depicted on the side of trailer 610, but may be positioned or configured at any location on the trailer 610. Fluid to be treated flows into main inlet 624 and into conduit 620. Conduit 620 conveys the fluid to be treated into a fluid inlet 616 in each treatment vessel 612, 614. Once treated by treatment vessels 612, 614, treated fluid may exit the treatment vessels via fluid outlet 618 into conduit 622. Conduit 622 may convey the treated fluid to main outlet 626 which may be connected to the facility supplying the water and wastewater to be treated, thereby returning treated fluid.

Note that conduits 620 and 622 may connect to the respective inlets and outlets 616 and 618 in any manner known in the art. However, because the quick adaptability of the system is advantageous, such connections are preferably with "quick connect" type (not shown) connectors so that the connections can be quickly and easily connected and disconnected from each treatment vessel 612.

In order to provide quick adaptation of the system or regeneration of the ion exchange resin(s), the treatment vessels 612, 614 must be capable of being quickly removed and replaced in the system. However, such treatment vessels 612 must be properly secured during transportation. For example the Federal Motor Carrier Safety Administration requires all loads to be properly secured by at least two (2) points during transport. The present invention provides, among other things, a novel and advantageous system that abides by all carrier requirements for the transport of the water and wastewater treatment system while still providing for the quick adaptation of the system and/or exchange of the treatment vessels 612.

Figure 7A:
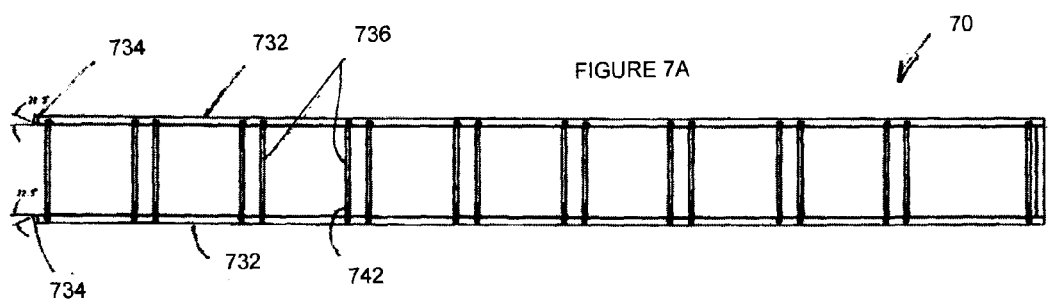
FIGS. 7A and 7B are plan views of a rail and locking member system that may be used in mobile water and wastewater treatment systems in accordance with some embodiments of the present invention.
Figure 7B:
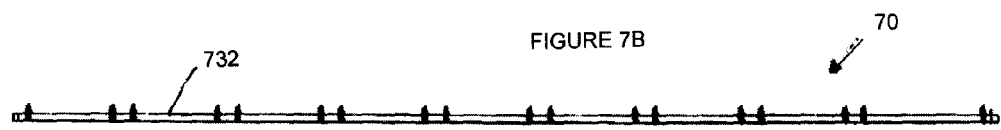

Turning to FIGS. 7A and 7B, a guide and locking system 70 will now be discussed. The guide and locking system 70 comprises a pair of spaced apart, elongated guide rails 732. The guide rails 732 may be spaced apart by a selected distance which is measured to accommodate the support frame (to be discussed later) of the treatment vessels 612. The spaced apart elongated rails 732 are constructed of any material and in any shape that provides the necessary support and structure, for example using metal angle iron.

For applications where the guide and locking system 70 is employed in a closed trailer, or van, the guide and locking system 70 may be configured to slide in and out of doors typically located at one distal end of the trailer. Additionally, for arrangements in closed trailers or vans, the guide and locking system 70 may be configured to easily align, guide, and slide treatment vessels along the guide rails without requiring removal of the guide rails 732 from the trailer. For such applications, the end portions of the rails 732 that are closest to the opening in trailer may comprise a guide portion 734 that may be configured to assist in the movement or sliding action of the support frame of a treatment vessel 10 from an opening in the trailer, along the floor of the trailer into and between the elongated rails 732. For example, the guide portion 734 may comprise an angled guide portion at various angles. While various angles can be employed to suit particular treatment vessel support frames, the applicants have found that an angle of 22.5° is effective.

Figure 10:
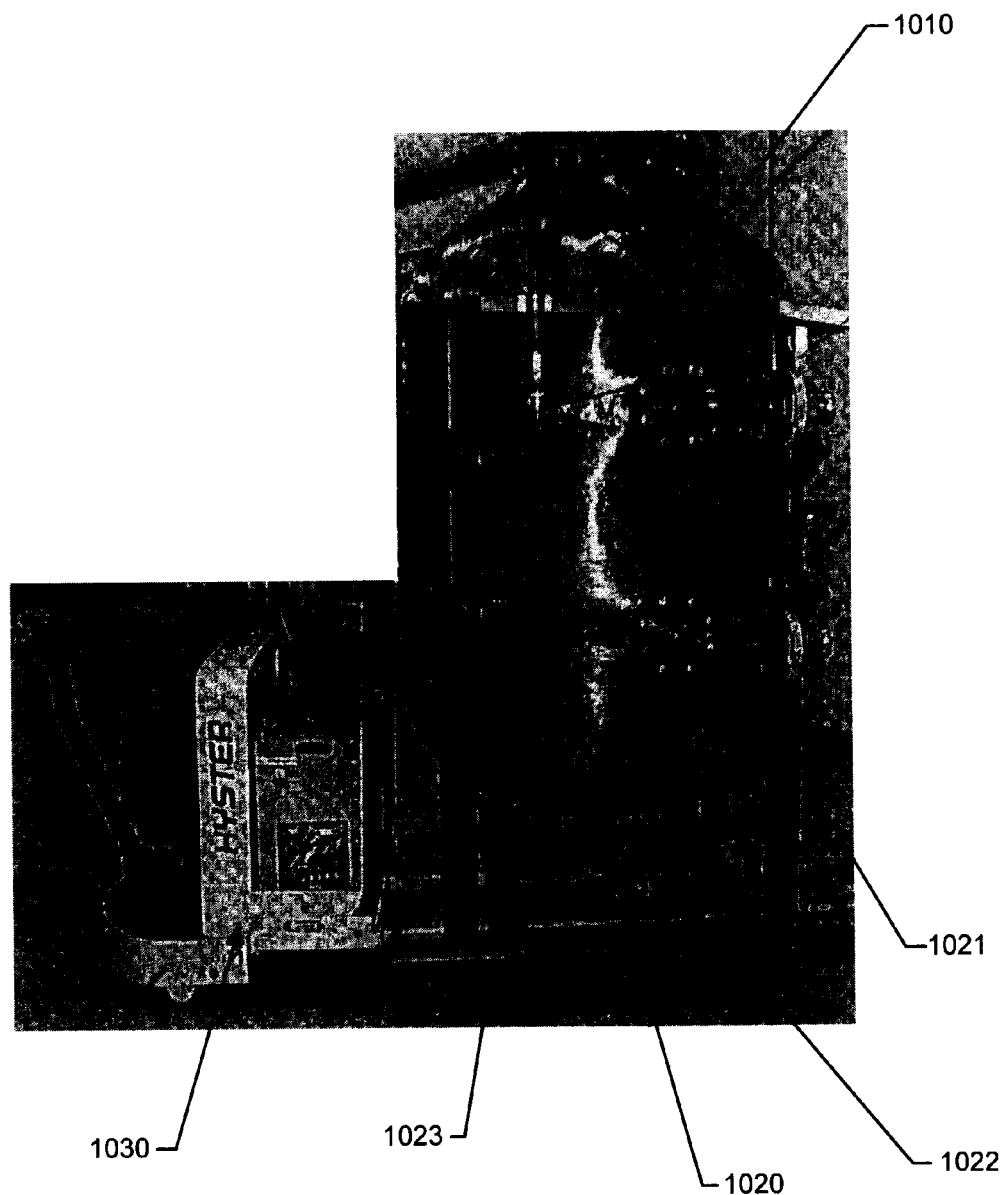
FIG. 10 is a perspective view of a water treatment tank that may be used in conjunction with a mobile water and wastewater treatment system in accordance with some embodiments of the present invention.
Figure 12:
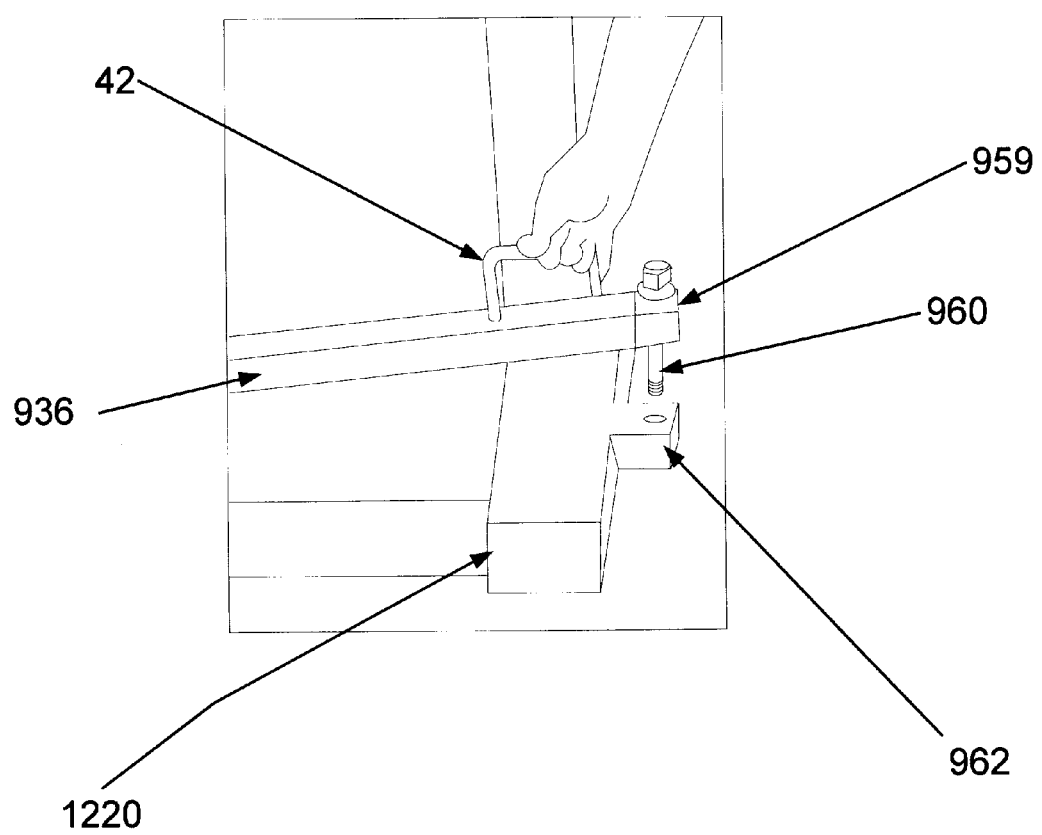
FIG. 12 illustrates an exemplary water treatment tank attached to a locking and guide system in accordance with some embodiments of the present invention.

With continued reference to FIGS. 7A and 7B, the locking and guide system 70 also may comprise a multiplicity of cross members 736 which may extend substantially perpendicularly across the space between the elongated rails 732. Each of the treatment vessels 1022 is attached to a respective frame 1020 as shown in FIG. 10. Each of the frames 1020 includes a pair of parallel feet 1022 positioned between and in parallel alignment with the rails 732 as shown in FIG. 12. At least one cross member 736 extends over a top side of each of the pair of feet 1022 of a respective treatment vessel 1010 as shown in FIG. 12 to removably attach the respective treatment vessel to the mobile device. There are sufficient cross members 736 such that each treatment vessel 12 is matched with a cross member 736, preferably two cross members 736, as will be described below. Cross members 736 may comprise a rounded portion 740 located at a proximal and distal end of the cross member 736.

With reference to FIGS. 8 and 9, the locking and guide system may be configured so that each cross member 736 may be releasably locked into a selected position to accommodate a particular treatment vessel. One of the elongated rails 732 may comprise a lock receiving member 738 which may each receive a lock member in the form a rounded portion 740 on one end of the cross member 736. In order to assist in the manual and machine-assisted manipulation of the cross members 736, each cross member 736 may comprise a handle 742.

FIG. 9 depicts the other end of the cross member 736 which has a bolt receiver member 959 that extends outwardly from the cross member. Bolt receiving member 956 receives a bolt 960. The bolt receiving member 959 and bolt 960 together form a lock member. Lock receiving member 962 extends from elongated rail 732 and is typically fixed in a selected location such as by welding or the like. The lock receiving member 962 has an opening 963 which also receives bolt 960. The lock receiving member 962 also has a member 964 which may have a threaded portion (not shown) for receiving the bolt. Rotation of the bolt 960 may cause the bolt 960 to release cross member 936 from the selected location through lock receiving member 964. Other types of bolt, screw and fixing means can be employed as alternative structures to releasably secure cross member 936 to elongated rail 732.

Attention is now directed to FIG. 10, which illustrates an exemplary treatment vessel 1010 that may be utilized in the locking and guide system in accordance with some embodiments of the present invention. Treatment vessel 1010 may be surrounded by a frame 1020 that may support the treatment vessel 1010 during transport, use, and regeneration. The frame 1020 may comprise a plurality of legs 1021, which in turn may comprise one or more substantially horizontally oriented feet 1022. The feet 1022 may be spaced just less than the distance the elongated rails 732 are spaced apart to assist in the sliding of the treatment vessel 1010 between the elongated rails 732. Frame 50 may also comprise one or more reinforcing members 1023 that may extend between the feet 1022 in order to provide additional support and stability.

Each foot 1022 may extend longitudinally beyond its corresponding legs 1021 by a distance sufficient to allow the cross members 736, 936 to extend across and engage feet 1022.

As shown in FIG. 10, a lift or other mechanical lifting device (e.g., forklift, etc.) 1030 may be utilized to transport the treatment vessel 1010 and frame 1020 as a single unit to and from a water treatment system. In this manner, the water treatment system can be quickly and efficiently modified, or exhausted treatment vessels may be swapped with fresh treatment vessels, so that the exhausted treatment vessels may undergo regeneration.

Figure 11:
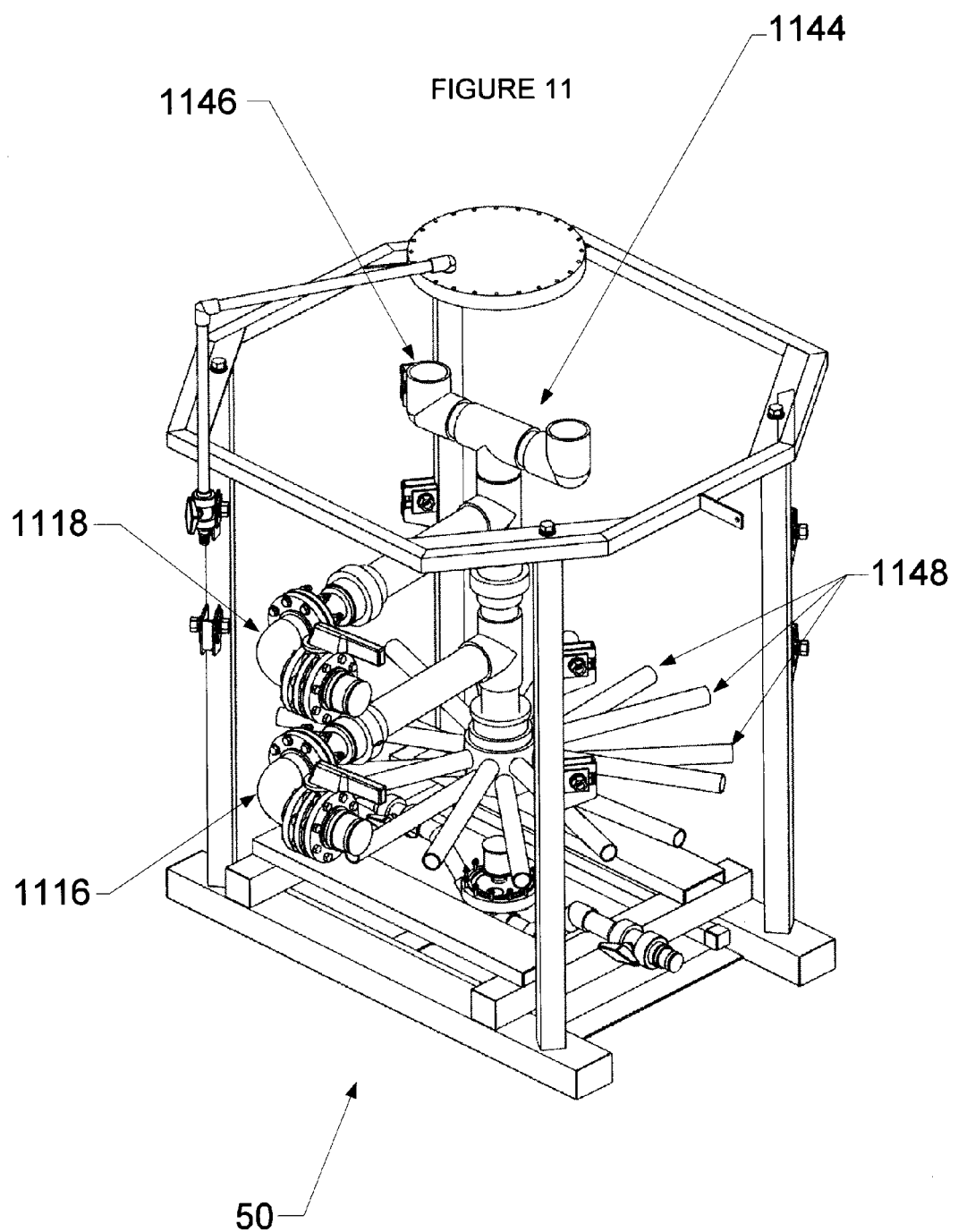
FIG. 11 is perspective schematic view of an exemplary internal structure of a water treatment tank, with the tank itself removed and a frame support system surrounding the tank, which may be used in conjunction with a mobile water and wastewater treatment system in accordance with some embodiments of the present invention.

With reference to FIG. 11, each treatment vessel 1010 may comprise an internal conduit structure 1144 which may be connected to the inlet 1116 and outlet 1118. The internal conduit structure 1144 may further comprise an inlet distributor 1146 and an outlet receiver 1148. Outlet receiver 1148 may be configured in a hub and spoke arrangement, and may be located near the bottom of the treatment vessel to intake fluid that has flowed downwardly from an upper portion of the treatment vessel to a lower portion of the treatment vessel 1010. The treatment vessel may comprise a filtration substance, such as an ion exchange resin, through which the fluid to be treated may flow from an upper portion of the treatment vessel, through the filtration substance, and into the lower portion of the treatment vessel. It should be understood that the structure illustrated in FIG. 11 is merely exemplary and representative, and alternative structures may be employed.

FIG. 12 shows a cross member 936 extending over a top side of a foot 1022 with the assistance of handle 42. Cross member 936 can be releasably locked into a selected position by engaging the bolt 960 which extends through a through hole in a lock member bolt receiver portion 959 for engagement with lock receiving member 962 which also has a threaded portion 964 to receive bolt 960. Bolt 960 is rotated into a locked position or an unlocked position depending on whether the treatment vessel is to be "locked" or into an "unlocked" position.

Utilizing the apparatus described above, it is possible to provide a highly efficient mobile water and wastewater treatment system and method whereby a trailer transporting a filtration system can be easily moved to a site that produces water and/or wastewater in need of treatment such as deionization. The trailer can be moved to a selected position and "quick connect" water/wastewater to be treated can be supplied to inlet and a similar quick connect can be utilized for the treated water. Then, the flow of water to be treated can be initiated and treatment of water can proceed. The capacity and flow of water to be treated can be controlled by a controller such an electronic controller, not shown. Such controllers can monitor any number of process parameters, such as the degree of treatment of the treated water. This can help determine when the ion exchange resin in the water treatment tanks is in need of regeneration. Upon such a determination, the water treatment process can be discontinued.

If the water and wastewater treatment system needs to be modified, or if the ion exchange resin needs to be regenerated, the inlets and outlets for the system can be disconnected and the trailer removed. An alternative trailer with the appropriate filtration system (or with regenerated ion exchange resin) can then be connected to the fluid to be treated, thereby minimizing any down-time in the system. The trailer removed may be transported to a facility where the system may be modified and tailored to the specific application, or where the ion exchange resin can be regenerated.

Utilizing a guide and locking system in accordance with some embodiments of the present invention, treatment vessels 1010 may be equipped with quick connect couplings so that treatment vessels may be quickly installed and removed from the guide and locking system. In operation, to remove a treatment vessel it is disconnected from the quick connect couplings that provide fluid connection between the treatment vessel and the conduits mounted on the trailer. The feet foot 1022 of the treatment vessel is then unlocked from the cross members 936 and the treatment vessel may removed by sliding it along the elongated rails 732 and out of the trailer.

Although it is contemplated that the treatment vessels may be modified (e.g., regenerated or replacing one ion exchange resin with another) in the trailer, such modifications may be more convenient to make subsequent to removal of the treatment vessels from the trailer.

Treatment vessels (either different treatment vessels or the same treatment vessels that have been modified or regenerated) may then be reintroduced into the trailer by reversing the removal operation and sliding the treatment vessels along the elongated rails until they are in position and then locking the feet of the treatment vessels to the cross rails of the guide and locking system.

The systems and methods of the present invention greatly improve the efficiency of the water/wastewater treatment process since the change of treatment vessels within a trailer can be achieved in approximately one hour or less (compared to prior art systems that typically require five hours or more). The present invention also simplifies operations at the regeneration facility since there is no particular time pressure placed on the regeneration facility to quickly regenerate a particular treatment vessel. Since the treatment vessels are fungible, different treatment vessels 712 can be placed on a trailer as soon as the existing treatment vessels are removed. This allows for a more consistent operation of the regeneration facility.

Although the apparatus and methods have been described in connection with specific forms thereof, it will be appreciated that a wide variety of equivalents may be substituted for the specified elements described herein without departing from the spirit and scope of this disclosure as described in the appended claims. For instance, if flatbed trailers are utilized, the cross rails may be permanently positioned substantially perpendicular to the elongated rails, and the cross rails, rather than the guide rails, may comprise an angled guide portion so that a forklift or similar device may be arranged in alignment with the cross rails for quick removal. Alternatively, the present invention may be configured for an environment equipped with a crane, and angled guide portions may be configured in more of a vertical arrangement to guide the insertion of treatment tanks onto the trailer and locking system via crane. Numerous modifications to the systems and methods of the present invention may be configured by one of ordinary skill in the art without departing from the scope of the present invention.

The invention claimed is:

1. A fluid treatment system comprising:
a mobile device;
a track system connected to the mobile device, the track system including a pair of spaced apart, substantially parallel rails, and one or more lock receiving members fixedly attached to each of the rails;
one or more treatment vessels, wherein each the treatment vessels are attached to a respective frame, each of the frames including a pair of parallel feet, wherein each of the pairs of parallel feet are positioned between the rails and are in parallel alignment with the rails;
at least one cross member extending over a top side of each of the pair of feet to removably attach the respective treatment vessel to the mobile device, wherein each end of a said cross member includes a lock member, and wherein each said lock member of the respective cross member engages the respective lock receiving member on the respective rail to removably attach the respective end of the cross member to the respective rail
a treatment material disposed inside each of the treatment vessels;
wherein each of the treatment vessels includes at least one fluid inlet and at least one fluid outlet;
an input conduit that receives a fluid to be treated, the input conduit in fluid communication with the fluid inlet on each of the treatment vessels; and
an output conduit in fluid communication with the fluid outlet on each of the treatment vessels, the output conduit receives treated fluid from each of the treatment vessels via the fluid outlets.

2. The system according to claim 1, wherein the treatment material is ion exchange resin.

3. The system according to claim 1, wherein the one or more treatment vessels comprise: one or more treatment vessels filled with cation ion exchange resin; one or more treatment vessels filled with anion ion exchange resin; and one or more treatment vessels filled with a mixture of cation and anion ion exchange resin.

4. The system according to claim 1, wherein the treatment material in the one or more treatment vessels is selected from the group consisting of: a cation ion exchange resin; an anion ion exchange resin; a mixture of cation and anion exchange resin; sand; and other filtration media.

5. The system according to claim 1, wherein the mobile device is a trailer.

6. The system according to claim 1, wherein the mobile device is a truck.

7. The system according to claim 1, wherein the exterior side surfaces of the feet engage interior side surfaces of the rails of the track system.

8. The system according to claim 1, wherein each of the frames comprises four substantially vertically oriented legs connected to the respective pair of feet.

9. The system according to claim 8, wherein each of the pairs of feet have exterior side surfaces spaced apart at a distance slightly less than the distance between interior facing side surfaces of the rails.

* * * * *